United States Patent
Khansari et al.

(12) 
(10) Patent No.: US 6,446,131 B1
(45) Date of Patent: Sep. 3, 2002

(54) BRIDGES AND OTHER LAYER-TWO DEVICES FOR FORWARDING MAC FRAMES

(75) Inventors: Masoud Khansari; Derek Lam, both of Sunnyvale, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/336,551

(22) Filed: Jun. 19, 1999

(51) Int. Cl.[7] ............................................. G06F 15/173
(52) U.S. Cl. .................. 709/238; 709/239; 709/240; 709/241; 709/242; 359/117; 370/230; 370/229; 370/256
(58) Field of Search ................... 709/238, 239, 709/240, 241, 242, 229, 237; 359/117; 370/351, 254, 256, 229, 230, 414, 416

(56) References Cited

U.S. PATENT DOCUMENTS

| | | | | |
|---|---|---|---|---|
| 4,922,503 A | * | 5/1990 | Leone | 370/402 |
| 5,343,471 A | * | 8/1994 | Cassagnol | 370/401 |
| 5,396,493 A | * | 3/1995 | Sugiyama | 370/403 |
| 6,038,600 A | * | 3/2000 | Faulk, Jr. et al. | 709/224 |
| 6,128,729 A | * | 10/2000 | Kimball et al. | 713/1 |
| 6,169,741 B1 | * | 1/2001 | LeMaire et al. | 370/401 |
| 6,301,256 B1 | * | 10/2001 | Vasa | 370/401 |
| 6,308,218 B1 | * | 10/2001 | Vasa | 709/238 |

* cited by examiner

Primary Examiner—Saleh Najjar

(57) ABSTRACT

A bridge or other transparent layer-two device uses a simple protocol to filter duplicate frames and learn about nodes connected to a bridged local area network. Using the simple protocol, the bridge or other layer-two device does not need to run a Spanning Tree algorithm.

24 Claims, 7 Drawing Sheets

FIG. 1
(Prior Art)
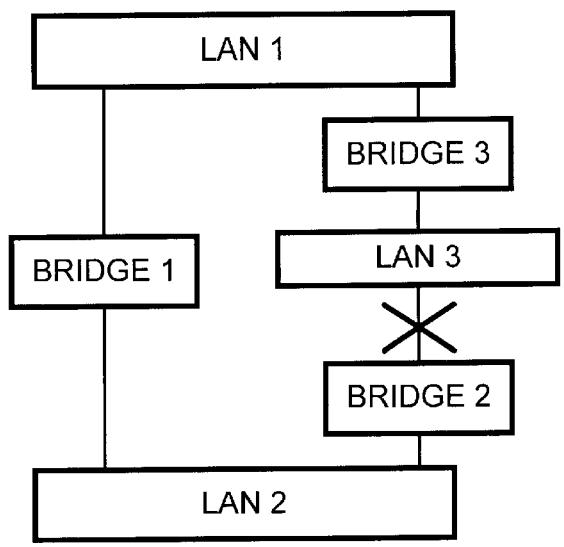
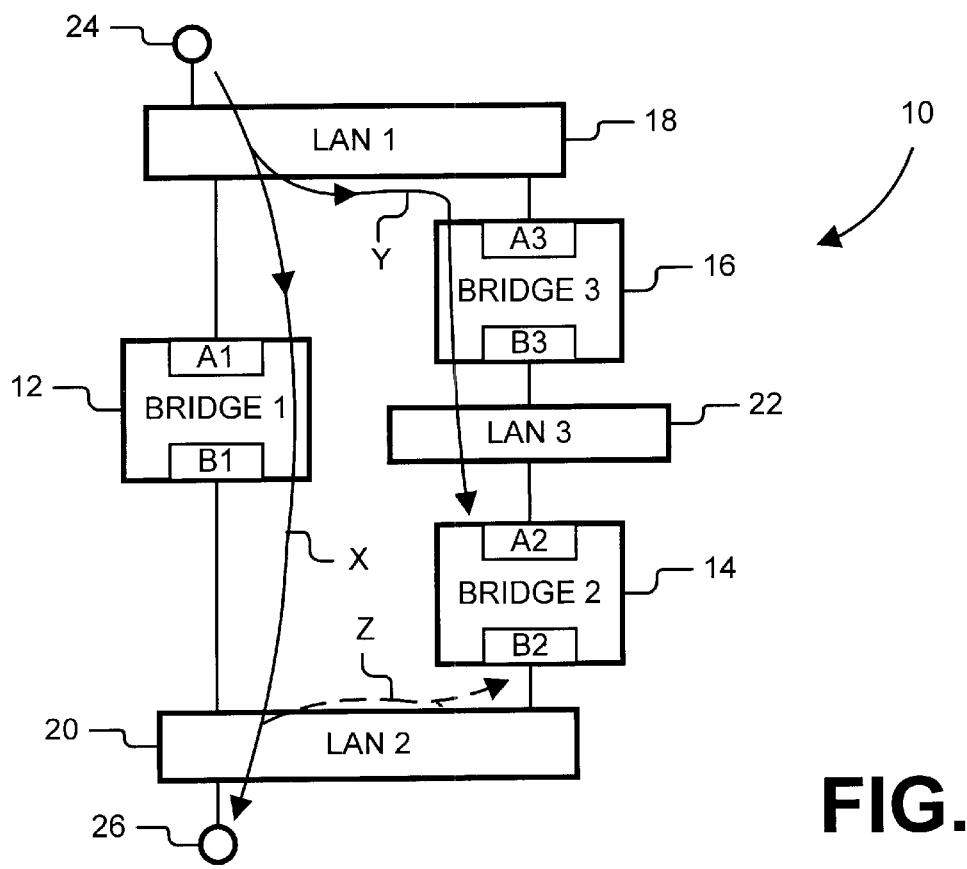
FIG. 2a

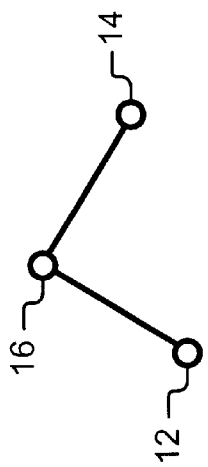
FIG. 3a
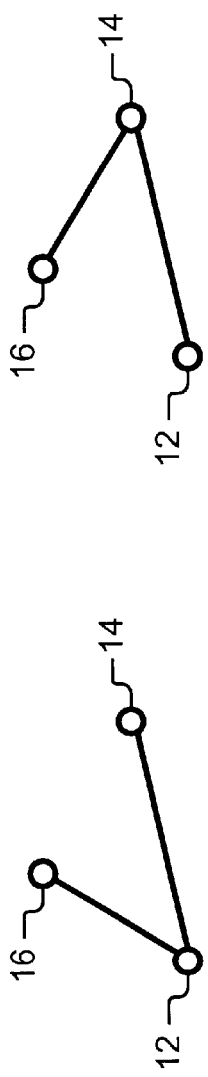
FIG. 3b
FIG. 3c
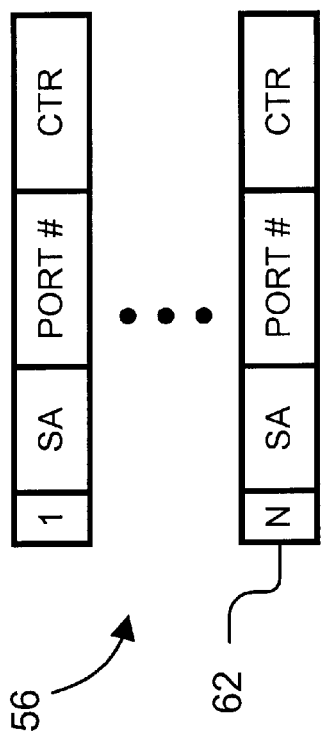
FIG. 6
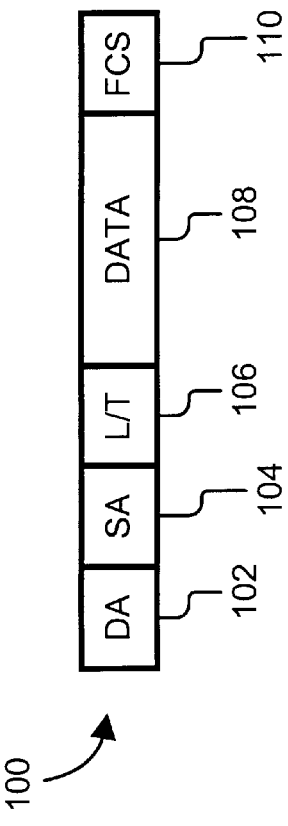
FIG. 4

BRIDGES AND OTHER LAYER-TWO DEVICES FOR FORWARDING MAC FRAMES

BACKGROUND OF THE INVENTION

The present invention relates generally to computer networks. More specifically, the present invention relates to bridges and other transparent layer-two devices for a local area network.

In a legacy local area network ("LAN"), each node of the LAN receives (or hears) all current on-going traffic. Each node looks at a destination address of each MAC frame placed on the LAN. A node accepts a MAC frame that is broadcasted or targeted directly to itself; otherwise the node discards the frame. This rather simplistic and trivial operation can provide adequate throughput and performance to small, low speed LANs, even though problems such as limited throughput could occur.

The LAN might be connected to other broadcast domains (e.g., another LAN) by a layer-three device such as a router. If a source node connected to the LAN sends frames to a destination node in a different broadcast domain, the frame would be forwarded to the different domain using layer-three mechanisms.

Such a LAN is typically segmented according to an 80/20 rule, in which inter-LAN traffic constitutes only 20% of the overall traffic. The throughput and the performance of this LAN architecture is limited because routing is usually done in software and is a rather expensive and slow operation.

As the number of nodes connected to the LAN is increased, it becomes increasingly difficult to follow the 80/20 rule. Increasing the number of broadcast domains while keeping constant the number of nodes in each broadcast domain could cause a substantial amount of inter-LAN traffic going through the routers and, hence, slow down the overall network performance. An alternative approach of increasing the number of nodes per broadcast domain would not be satisfactory because the number of collisions in each broadcast domain would be increased and the overall throughput would be reduced.

Bridges have been used to overcome this dilemma. Bridges are layer-two devices, which operate on frames and not packets. A bridge segments a LAN into multiple segments. Typically, a bridge is connected to two or more LAN segments. One function of the bridge is to forward or relay a frame from one segment to another segment at any given time instant. Broadcast messages are transmitted to all nodes on all segments connected to the bridge. However, unicast messages are sent only to the intended segments. Consequently, unicast messages intended for one segment are not heard by the other segments. Thus, by sending unicast messages to specific LAN segments, a bridge can reduce the overall number of collisions on a LAN.

If a bridge receives a unicast frame but does not know where to forward it (i.e. it does not know the specific LAN segment to which the destination node belongs), the bridge will broadcast the message to all of the LAN segments. It is therefore advantageous for a bridge to be aware of the overall topology of the LAN and know which node is connected to which segment.

Another function of bridges is to filter frames so that the destination node does not receive duplicate frames. To prevent the duplicate frames from being received, the bridges typically run an algorithm known as Spanning Tree algorithm. The Spanning Tree algorithm determines network connectivity such that there is at most one data route between any two nodes of the bridged LAN. The Spanning Tree algorithm starts with the bridged LAN's arbitrary topology and determines a single Spanning Tree. The Spanning Tree ensures that, at any moment, only one active physical path will be used between each pair of source and destination nodes of the network. For example, FIG. 1 shows a network having two physical paths to a node. After running the spanning tree algorithm, one of those paths (crossed out with the large "X") is made inactive (i.e., disabled).

Using the Spanning Tree algorithm, a bridged LAN can be dynamically reconfigured and new physical paths can be re-established. The Spanning Tree algorithm may be run whenever the network is booted up, whenever the network topology is changed (e.g., a new node is added, an existing node or a link fails), etc. It can take a relatively long time for the Spanning Tree algorithm to converge at a final Spanning Tree. It is not uncommon for thirty seconds to elapse before a final active Spanning Tree becomes stable. During this period while the Spanning Tree algorithm is being run, most of the frames are not forwarded to their intended destination and, therefore, are discarded.

The convergence speed of the Spanning Tree algorithm might be adequate for low speed networks. However it is usually too slow for high-speed LANs such as Fast Ethernet (100 BaseT) or Gigabit Ethernet. The slow speed can become a major drawback. Discarding thirty seconds worth of frames on a high speed network can amount to discarding a substantial amount of traffic.

Additionally, the Spanning Tree algorithm does not necessarily find an optimum path between any two nodes. For example, referring once again to FIG. 1, if a node connected to the third LAN sends a frame to a node connected to the second LAN, the frame will not be forwarded by the second bridge. Instead, the frame will be sent to the third bridge and then to the first bridge before arriving at the destination node.

There is a need to reduce the number of frames that are discarded while network connectivity is being determined. There is also a need to provide more optimal network connectivity.

SUMMARY OF THE INVENTION

The present invention meets these needs. According to one aspect of the invention, a transparent layer-two device of a local area network receives a MAC frame on an inbound port and handles the frame by determining whether the frame was previously received on a port other than the inbound port; discarding the frame if the frame was previously received; further filtering the frame if the frame was not discarded; and forwarding the frame if the frame was not filtered out.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is an illustration of a bridged local area network in accordance with the prior art;

FIGS. 2a and 2b are illustrations of a bridged local area network in accordance with the present invention;

FIGS. 3a, 3b and 3c are illustrations of network connectivity for bridges of the bridged local area network according to the present invention;

FIG. 4 is an illustration of a MAC frame;

FIG. 6 is an illustration of a Filtering Database for the bridge of FIG. 5;

DETAILED DESCRIPTION OF THE INVENTION

Figure 2B:
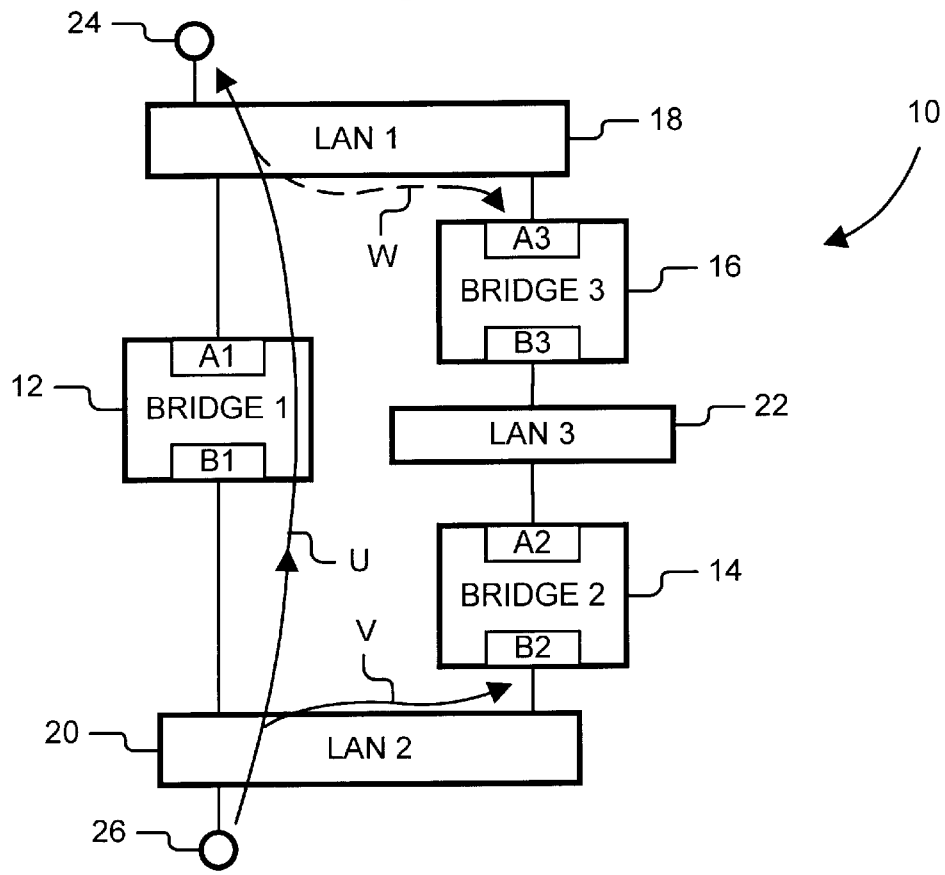

As shown in the drawings for purposes of illustration, the invention is embodied in a bridge for a LAN. The bridge uses a simple protocol to prevent duplicate frames from being received by destination nodes connected to the LAN. The bridges do not run a Spanning Tree algorithm. Consequently, the bridges avoid certain problems associated with the running of Spanning Tree Algorithms, such as the dropping of frames while network connectivity is being determined.

FIGS. 2a and 2b show a bridged LAN 10 including first, second and third bridges 12, 14 and 16 that are connected to first, second and third LAN segments 18, 20 and 22. The first bridge 12 has upper and lower ports A1 and B1, the second bridge 14 has upper and lower ports A2 and B2, and the third bridge has upper and lower ports A3 and B3. To help explain the invention, a first node (or end station) 24 connected to the first LAN segment 18 is illustrated, and a second node 26 connected to the second LAN segment 20 is illustrated. The bridges 12, 14 and 16 are layer-two devices and are transparent to the nodes on the LAN segments 18, 20 and 22 (including the first and second nodes 24 and 26). That is, the nodes operate as if the bridges 12, 14 and 16 are not present. Each node may include a media access controller, which accepts unicast messages destined for that node. The media access controller also accepts broadcast messages and certain multicast messages.

It is understood that this simple configuration for the bridged LAN 10 is shown merely to help explain the invention. In practice, the bridged LAN 10 may contain any number of bridges, LAN segments, nodes and other devices. The bridged LAN 10 may be a domain of a larger network and, therefore it may be interconnected to other broadcast domains by layer-three devices such as routers.

The bridges 12, 14 and 16 operate according to a protocol for forwarding frames to appropriate LAN segments and for filtering frames so that duplicates are not received by destination nodes. Using this protocol, the bridges 12, 14 and 16 do not need to run a Spanning Tree algorithm.

An overview of the protocol will now be described by making reference to first and second examples, which are illustrated in FIGS. 2a and 2b, respectively. Reference is made first to FIG. 2a. The bridges 12, 14 and 16 are aware of the first node 24 but not the second node 26. That is, all of the bridges 12, 14 and 16 have learned about the first node 24 but not the second node 26. Node-to-port assignments are as follows:

TABLE 1

| | First Bridge 12 | Second Bridge 14 | Third Bridge 16 |
|---|---|---|---|
| Node 24 | Port A1 | Port B2 | Port A3 |
| Node 26 | — | — | — |

The first example begins with the first node 24 placing a frame on the first LAN segment 18. Upper ports A1 and A3 of the first and third bridges 12 and 16 receive the frame. Since the destination address of the frame is not known to the first and third bridges 12 and 16, the first and third bridges 12 and 16 do not know the specific LAN segments to which the frame should be forwarded. Therefore, the frame is broadcasted by the first and third bridges 12 and 16. As a result of the broadcasting, the frame is placed on the second and third LAN segments 20 and 22.

The second node 26 receives the frame on the second LAN segment 20. Thus, a first forward path X begins at the first node 24 and is terminated at the second node 26.

The frame follows a second forward path Y, moving along the third LAN segment 22 to the upper port A2 of the second bridge 14. The frame also follows a loop-back path Z (indicated in dashed lines), moving along the second LAN segment 20 and reaching the lower port B2 of the second bridge 14. Assume now that the frame traveling along the second forward path Y reaches the second bridge 14 before the frame traveling along the loop back path Z.

The second bridge 14 determines that the frame has been received on an inbound port (port A2) that is different than the port with which the first node 24 source is associated (port B2). Since the same frame has not yet been received, the second bridge records a new association (of the first node 24 to the upper port A2) and sends the frame for forwarding.

Before the frame can be forwarded, however, the frame traveling along the loop back path Z arrives at the lower port B2. Consequently, the second bridge does not forward the frame received on the upper port A2 because another port (port B2) has seen that frame. Therefore, the frame on the upper port A2 is discarded, and the second forward path Y is terminated.

The second bridge 14 also discards the frame received on the lower port B2 because it has already received the same frame on a different port—the upper port A2. Consequently, the loop back path Z is terminated by the second bridge 16.

Thus, the second node 26 receives the frame only once. All duplicate frames are blocked (i.e., filtered and discarded).

Reference is now made to FIG. 2b. In the second example, as with the first example, the bridges 12, 14 and 16 are aware of the first node 24 but they are not initially aware of the second node 26. Associations are the same as described in Table 1 above: the first bridge 12 associates its upper port A1 with the first node 24, the second bridge 14 associates its lower port B2 with the first node 24, and the third bridge 16 associates its upper port A3 with the first node 24. In the second example, however, the bridges 12, 14 and 16 learn about the second node 26.

The second example begins with the second node 26 placing a frame on the second LAN segment 20. The first bridge 12 receives the frame on its lower port B1. The first bridge 12 associates its lower port B2 with the second node 26. The first bridge 12 is now aware of the second node 26.

Since the first (destination) node 24 is associated with its upper port A1, the first bridge 12 forwards the frame to a specific port—its upper port A1. The frame reaches the first node 24 via the first LAN segment 18. Thus, the frame follows a first forward path U from the second node 26 to the first node 24.

The second bridge 14 also receives the frame on its lower port B2. The second bridge 14 associates its lower port B2 with the second node 26. The second bridge 14 is now aware of the second node 26.

However, the second bridge 14 determines that the port to which the frame should be forwarded (the lower port B2) is the same port on which the frame was received. Therefore the second bridge 14 discards the frame. Thus, a second forward path V is terminated by the second bridge 14.

When the frame arrives at the upper port A3 of the third bridge 16, the third bridge 16 associates its upper port A3 with the second node 26. The third bridge 16 is now aware of the second node 26.

The third bridge 16 does not forward the frame since the port to which the frame should be forwarded (the upper port A3) is the same as the port on which the frame was received. Thus, the loop back path W is terminated by the third bridge 16.

At the end of the second example, the first and second nodes 24 and 26 becomes associated with the bridges 12, 14 and 16 as follows.

TABLE 2

|  | First Bridge 12 | Second Bridge 14 | Third Bridge 16 |
| --- | --- | --- | --- |
| Node 24 | Port A1 | Port B2 | Port A3 |
| Node 26 | Port B1 | Port B2 | Port A3 |

Thus, each bridge 12, 14 and 16 follows a protocol to determine whether a frame should be forwarded or discarded. Moreover, each bridge 12,14 and 16 has a different logical connectivity: the first bridge 12 has a direct path to both the second and third bridges 14 and 16 (see FIG. 3a), the second bridge 14 has a direct path to both the first and third bridges 12 and 16 (see FIG. 3b), and the third bridge 16 has a direct path to both the first and second bridges 12 and 14 (see FIG. 3c). The need to run a Spanning Tree algorithm is eliminated. Moreover, the logical connectivity is more direct than that provided by a Spanning Tree.

Additionally, each bridge 12, 14 and 16 learns about nodes on the bridged LAN 10 by maintaining a database of source addresses and corresponding port numbers. If a bridge is not aware of a node but receives a frame from that node, the bridge will add a new entry to its database. The entry includes a source address indicated in the frame and inbound port number. The inbound port number becomes associated with the source address of that node.

FIG. 4 illustrates a MAC frame 100 in greater detail. Each MAC frame 100 includes a destination address 102, a source address 104, a field 106 indicating length or type, service user data 108 and a frame check sequence ("FCS") 110. Different types of MAC destination addresses include a unicast address, a multicast address and a broadcast address. The source address is typically the unicast MAC address of the transmitting node. The frame check sequence 110 is typically a CRC value.

Figure 5:
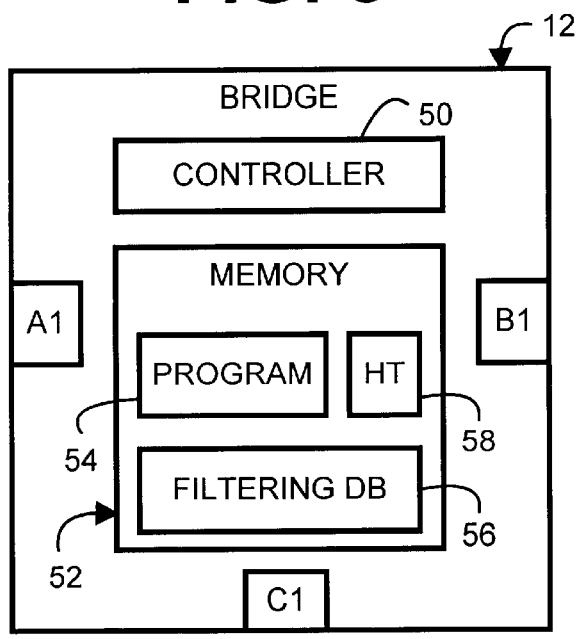
FIG. 5 is an illustration of a bridge according to the present invention.

Reference is now made to FIG. 5, which illustrates the first bridge 12 in greater detail (the second and third bridges 14 and 16 may have a similar construction). The first bridge 12 includes a processor-based controller 50, memory 52 and upper and lower ports A1 and B1. The first bridge 12 may also have additional ports (e.g., port C1). The first LAN segment 18 is connected to the upper port A1, and the second LAN segment 20 is connected to the lower port B1. The memory 52 includes a program 54 which instructs the controller 50 to perform the following functions: (1) relay and filtering of frames; (2) maintenance of the information required to make frame filtering and relaying decisions; and (3) management of (1) and (2). To perform these functions, the program 54 includes a learning module and a forwarding module. The learning and forwarding modules will be described below.

The first bridge 12 stores a Filtering Database 56 in the memory 52. The Filtering Database 56, which is illustrated in FIG. 6, includes a number of dynamic entries 62 and static entries (not shown). Static entries may be changed under management control. Each static entry includes a MAC address and a corresponding table which identifies different output ports for different input ports. Each dynamic entry 62, however associates only a single output port with each MAC source address.

The Filtering Database 56 is constantly interrogated and updated. For example, the dynamic entries 62 in the Filtering Database 56 may be removed after a specific period of time. Each dynamic entry 62 in the Filtering Database 60 may have an aging counter which is reset every time that entry is used to forward a frame. The aging counter may be incremented in specific time intervals. When the aging counter passes a certain parameter (known as aging parameter), the corresponding dynamic entry 62 is removed from the Filtering Database 56. The IEEE 802.1D standard suggests an aging parameter having a range of 10.0 to $10^6$ seconds, and a default value of 300 seconds. Thus, those nodes that are disconnected or have become inactive are gradually pruned from the Filtering Database 56.

Figure 7:
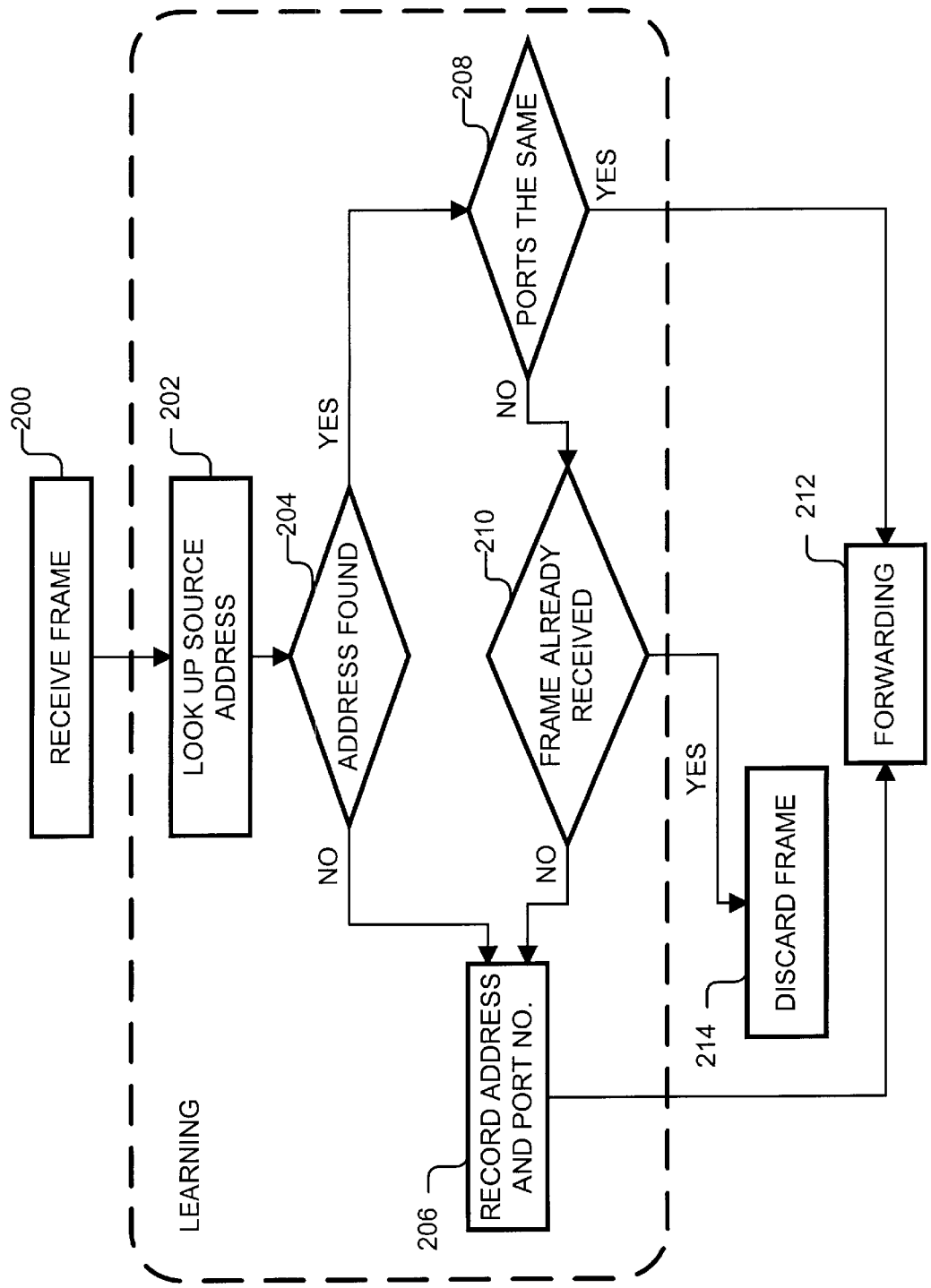
FIG. 7 is an illustration of a learning module for the bridge of FIG. 5.

Reference is now made to FIG. 7, which illustrates the learning module for the first bridge 12. When the first bridge 12 receives a new MAC frame on one of its ports A1, B1 or C1 (block 200), it reads the source address of the new frame. Then the first bridge 12 looks up the source address of the new frame in the Filtering Database 56 (block 202). If the source address of the new frame is not in the Filtering Database 56 (block 204), the first bridge 12 records the source address and inbound port number in the Filtering Database 56 (block 206). Thus, if the first bridge 12 received a new frame from a node of which it was not aware, the source address of that node and the inbound port number would be recorded in the Filtering Database 56. By recording the source address and inbound port number, the first bridge 12 becomes aware of the node. After the source address and inbound port number are recorded (block 206), the new frame is sent to the forwarding module (block 212).

If the source address is found in the Filtering Database (block 204), the first bridge 12 determines whether the port number of the database entry corresponding to the source address is the same as the inbound port number. If the port numbers are the same (block 208), it is assumed that the new frame is not a duplicate. Therefore, the new frame is sent to the forwarding module (block 212).

If, however, the port numbers are not the same (block 208), the first bridge 12 determines whether an identical frame was already received on a different port (block 210). If an identical frame was already received on a different port, the new frame is discarded (block 214). Thus, if the new frame was received via loop back path or a second forward path, the new frame would be blocked, and the loop back path or second forward path would be terminated.

Consequently, the destination node would not receive a duplicate frame via the loop back path or the second forward path.

If the ports are not the same (block 208) and the new frame is not identical to the frame already received, the database entry for the source address is updated (block 206). Thus, the old port number is replaced by the port number of the inbound port. As a result, the first bridge 12 associates the source address with the inbound port number. An example of updating a database entry will be provided below.

Figure 8:
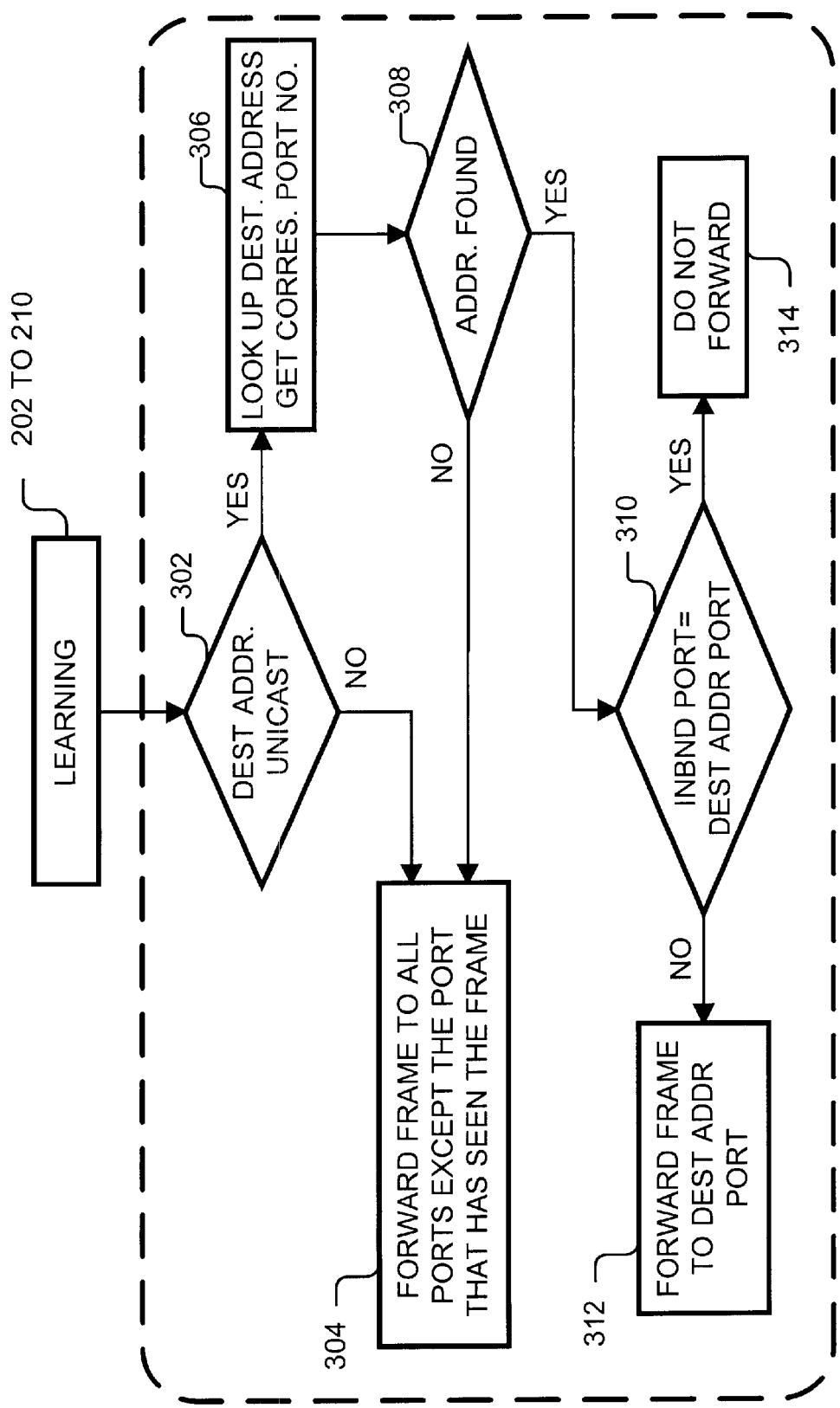
FIG. 8 is an illustration of a forwarding module for the bridge of FIG. 5.

FIG. 8 shows the module for forwarding the MAC frames. Forwarding is based on the destination address 104 of the MAC frame 100. If the new frame includes either a broadcast or multicast destination address (block 302), the new frame is forwarded to all the ports except the inbound port (block 304).

If, however, the new frame includes a unicast destination address (block 302), the first bridge 12 looks up the destination address in the Filtering Database 56 (block 306). If the address is found in the Filtering Database 56 (block 308), and the inbound port number is not the same as the destination address port, as indicated by the database entry (block 310), the new frame is forwarded to the destination address port (block 312). If the address is found in the Filtering Database 56 (block 308), but the inbound port number and the destination address port are the same (block 310), the new frame is discarded (block 314).

If the new frame includes a unicast destination address, but the unicast address does not have an entry in the Filtering Database 56 (block 308), the new frame is forwarded to all of the ports except the port that has seen the frame (block 304). Thus, if the same frame arrives at a different port immediately prior to the execution of block 304, the new frame will not be forwarded. This scenario was described above in connection with the termination of the second forward path Y in the first example.

Figure 9:
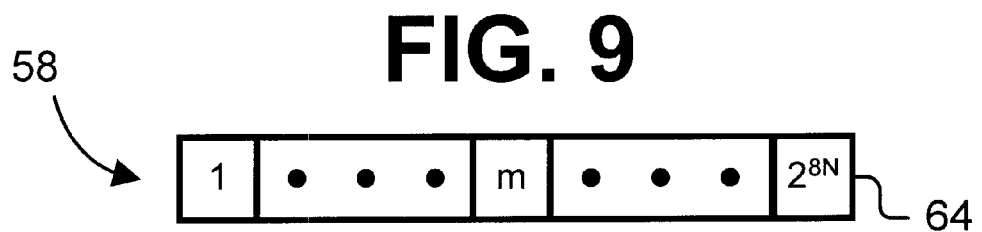
FIG. 9 is an illustration of a hash table for the bridge of FIG. 5.

Reference is now made to FIG. 9. In the learning module (blocks 202 to 210), a duplicate frame could be identified by maintaining a data table for all of the previously received frames and comparing the new frame to the previously received frames. A faster approach, however is to use a hash table 58 based on the FCS 110 of the MAC frame 100. The hash table 58 is stored in memory 52 (see FIG. 5).

Each entry 64 of the hash table 58 indicates whether a new frame has already been received. A value of 0 could indicate that the new frame has not yet been received, while a non-zero value could indicate that the new frame has already been received. The CRC value of the FCS field 110 provides an index to the hash table 58. Thus, when the first bridge 18 receives a new frame and the new frame has an FCS value of m, the bridge looks at the $m^{th}$ entry 64 of the hash table 58. If the $m^{th}$ entry 64 is empty, the first bridge 12 learns that an identical frame has not yet been received. Then the $m^{th}$ entry is marked as received.

Size of the hash table 58 (that is, the number of entries 64) depends in part upon the number N of bytes used from the FCS field 110. If all four bytes of the FCS field 110 are used as an index to the hash table 58, then the hash table 58 would have $2^{32}$ entries. To reduce the size of the hash table 58 to $2^{16}$ entries, only the lower two bytes of the FCS field 110 may be used.

Aging of each entry 64 in the hash table 58 is also performed. Aging could be performed by reducing each hash table entry 64 by a fractional value at a fixed time frequency. For example, when a new frame is received, a '1' is marked in its corresponding entry in the hash table 58. After every period, the hash table entry 64 is reduced by a factional value. After the aging time has expired, the corresponding hash table entry is reduced to '0', whereby the frame has been aged out.

The aging time, frequency and period will depend upon how fast the table 58 fills up. How fast the table 58 fills up will depend, in part, upon size of the table 58, the speed of the bridged LAN 10, the amount of traffic on the bridged LAN 10, etc. For example, a hash table 58 having $2^{16}$ entries may be aged over 50 milliseconds in a 100 BaseT (100 MB/s) system, where the worst case packet size is 64 bytes. For a slower 10 BaseT system, the entries 64 may be aged over 500 milliseconds.

Figure 10:
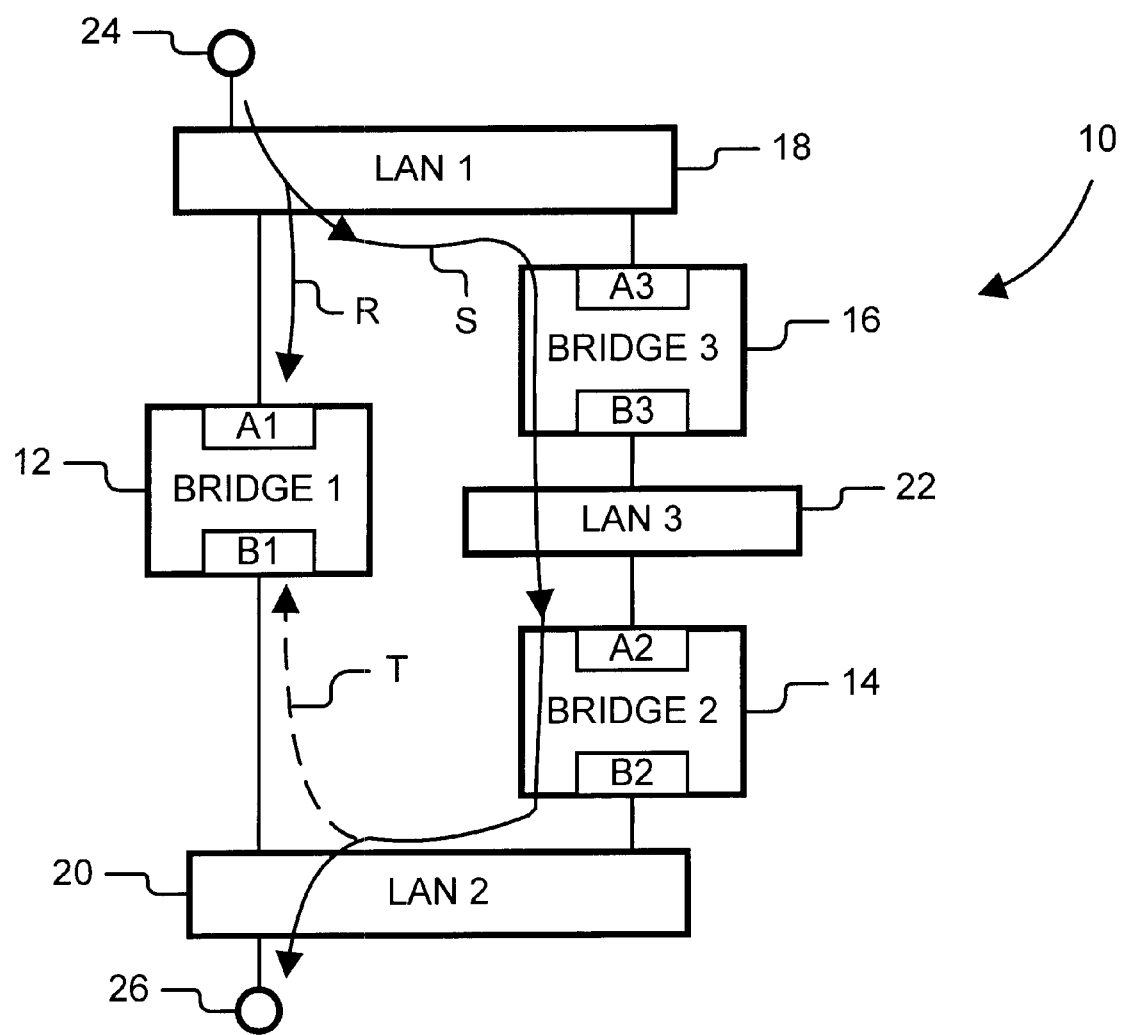
FIG. 10 is another illustration of the bridged local area network in accordance with the present invention.

Reference is now made to FIG. 10. Consider a subsequent transmission from the first node 24 to the second node 26. This time, assume that the first bridge 12 suffers a momentary, yet significant delay. As a result of this delay, the second and third bridges 14 and 16 are able to forward the first frame to the second node 26 before the first bridge 12 can forward the first frame to the second node 26. Thus, the second forward path S reaches the second node 26, and the first bridge 12 terminates the first forward path R and the loop back path T.

However, once the delay is removed, the first frame follows the paths X, Y and Z illustrated in FIG. 2a. Thus, the momentary delay by the first bridge 12 causes a flip-flop between the use of the first and second forward paths.

Figure 11:
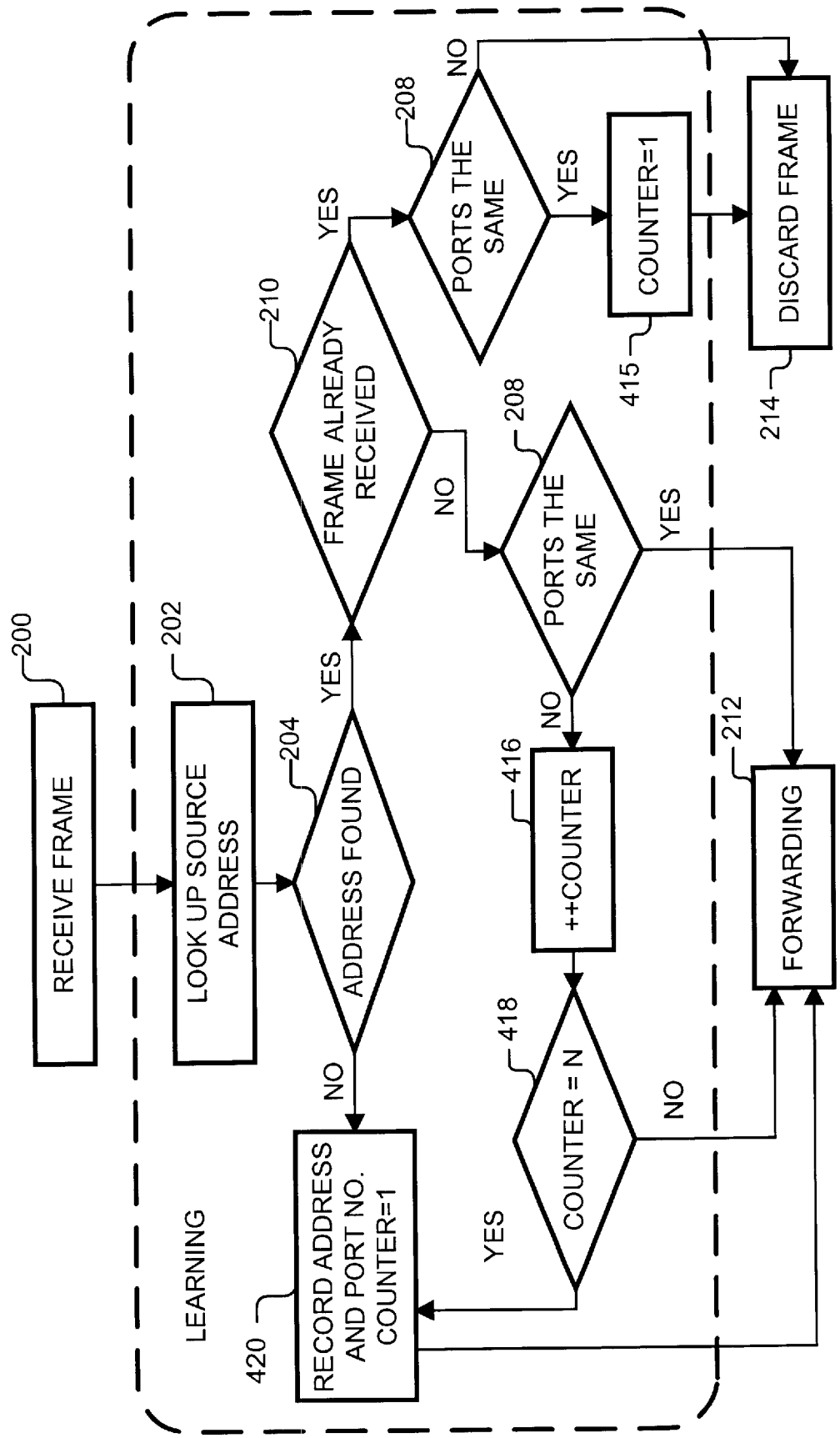
FIG. 11 is a state diagram of an alternative learning module for the bridge of FIG. 5.

This flip-flop can be avoided by adding a persistence check to the learning module. FIG. 11 shows a learning module having a persistence check. The persistence check can be implemented by adding a counter to the learning module of FIG. 7. The counter is started when a new frame is received from an unexpected port, that is, an inbound port that is different from the port in the Filtering Database (block 415). Each time a new frame is received from an unexpected port, the counter is incremented (blocks 416). The new frame is forwarded until the counter reaches a threshold (block 418). When the counter reaches the threshold, the counter is reset and a different port number is recorded in the Filtering Database (block 420). For example, when the delay in the first bridge 12 initially occurs, the frame will still follow the first forward path. If the delay persists, however, a switch will be made and the first frame will follow the second forward path.

Thus disclosed is an invention that uses a simple protocol to learn about nodes on a bridged LAN and to prevent duplicate frames from being received by destination nodes. Eliminated is the need to run a Spanning Tree algorithm. Consequently, the bridges avoid certain problems associated with the running of Spanning Tree algorithms, such as the dropping of frames while network connectivity is being determined.

Additionally, the invention places less of a constraint on active network topology. Consequently, additional links of the network can be utilized, which results in a more uniform distribution of the traffic on all the network links. Moreover, the logical connectivity provided by the present invention is more direct than that provided by a Spanning Tree algorithm.

The invention has a fault tolerant property with respect to path failures. For example, if one of the links on the first forward path from the first node 24 to the second node 26 goes down, the first frame will simply follow the second forward path to the second node 26. No frames will not be lost.

Although the invention has been described in connection with bridges, it is not so limited. For instance, the invention can be applied to other transparent layer-two devices such as LAN switches. From an operational point of view, a LAN switch is fundamentally the same as a bridge except that the LAN switch has multiple paths between each input-output port pair. Thus, the LAN switch is essentially a multi-port bridge that can forward multiple frames simultaneously. The LAN switch achieves a higher throughput and lower latency by simultaneously forwarding multiple frames.

The invention could also be applied to "Virtual LANs." In a Virtual LAN, physical connectivity and logical broadcast domain are completely separated. For example, two nodes belonging to two different broadcast domains (or VLANs) could be connected to the same physical connectivity.

Although specific embodiments of the invention have been described and illustrated, the invention is not limited to the specific forms or arrangements of parts so described and illustrated. For example, the learning module may check whether a frame has already been received (block 210) before checking whether the ports are the same (block 208). In this case, a bridge will discard the second transmission of the frame.

A hash table may be indexed in ways other than using frame check sequences. However, since the frame check sequences are already available, they are convenient to use. Moreover, identical frames may be identified in ways other than using hash tables.

In the above examples, the best path between a source node and a destination node was based on speed. However, the invention is not limited to such a cost function. Cost functions other than speed could be used to determine the best path from the source node to the destination node.

Therefore, the invention is not limited to the specific forms or arrangements of parts so described and illustrated. Instead, the invention is limited only by the claims that follow.

What is claimed is:

1. In a transparent layer-two device of a local area network, a method of handling a MAC frame received on an inbound port, the method comprising:
    determining whether the frame was previously received on a port other than the inbound port;
    discarding the frame if the frame was previously received on a port other than the inbound port;
    further filtering the frame if the frame was not discarded; and
    forwarding the frame if the frame was not filtered out.

2. The method of claim 1, further comprising maintaining a database of entries, each entry in the database including a source address and a corresponding port number, an entry being added if a source address of the frame received on the inbound port is not in the database, the added entry including the source address of the frame received on the inbound port and a port number of the inbound port.

3. The method of claim 2, wherein the further filtering of the frame includes examining a destination address of the frame; finding a database entry having the same destination address as the frame received on the inbound port; and, if an entry is not found, forwarding the frame to all of the ports except ports that have seen the frame.

4. The method of claim 2, wherein the further filtering of the frame includes examining a destination address of the frame; finding a database entry having the same destination address as the frame received on the inbound port; and filtering out the frame if the port on which the frame is received is the same as the port in the database entry that was found, whereby the frame is not forwarded to the port on which it was received.

5. The method of claim 2, wherein determining whether the frame was previously received is performed by:
    comparing the source address of the frame received on the inbound port to entries in the database; and
    for each database entry having a matching source address but a different port number than the inbound port number, comparing an identifier of the frame received on the inbound port to a frame identifier of the matching entry.

6. The method of claim 5, further comprising maintaining a hash table of identifiers of other frames already received, wherein determining whether the frame on the inbound port has already been received is performed by indexing the hash table and examining the contents of the indexed identifier.

7. The method of claim 6, wherein each frame includes a Frame Check Sequence code, and wherein the hash table is indexed by accessing at least N bytes of the Frame Check Sequence code of the frame received on the inbound port, where positive integer N>2.

8. The method of claim 7, wherein the Frame Check Sequence code is generated by a CRC procedure, and wherein a lower two bytes of the code are used to index the hash table.

9. The method of claim 6, further comprising the step of aging the identifiers in the hash table.

10. The method of claim 1, further comprising the step of performing a persistence check when determining whether the frame was previously received.

11. A layer-two device for a network, the device comprising:
    a plurality of ports for receiving MAC frames;
    means for determining whether an inbound frame received on an inbound port was previously received on a port other than the inbound port;
    discarding the inbound frame if the inbound frame was previously received on a port other than the inbound port;
    further filtering the inbound frame if the inbound frame was not discarded; and
    forwarding the inbound frame if the inbound frame was not filtered out.

12. A layer-two device for a network for a computer network, the device comprising:
    a plurality of ports;
    a controller; and
    computer memory;
    the computer memory being encoded with a program for instructing the controller to examine the source address of a frame received on an inbound port; determine whether the source address is in a Filtering database; forward the frame if the source address is not in the Filtering database; determine whether the frame was previously received on a port other than the inbound port if the source address is in the Filtering database; discard the frame if the frame was previously received on a port other than the inbound port; further filter the frame if the frame was not discarded; and forward the frame if the frame was not filtered out.

13. The device of claim 12, wherein the controller is instructed to determine whether the frame was previously received by maintaining a hash table of frame identifiers; indexing the hash table; and examining the contents of the indexed frame identifier.

14. The device of claim 13, wherein each frame includes a Frame Check Sequence code, and wherein the hash table is indexed by accessing at least N bytes of the Frame Check Sequence code of the frame, where positive integer N>2.

15. The device of claim 13, wherein the controller is further instructed to time-age the frame identifiers in the hash table.

16. The device of claim 12, wherein the controller is further instructed to perform a persistence check when determining whether the frame was previously received on a port other than the inbound port.

17. The device of claim 12, wherein the controller is instructed to perform the further filtering of the frame by examining a destination address of the frame; finding a database entry having the same destination address as the frame; and, if an entry is not found, forwarding the frame to all of the ports except ports that have seen the frame.

18. The device of claim 12, wherein the controller is instructed to perform the further filtering of the frame by examining a destination address of the frame; finding a database entry having the same destination address as the frame; and filtering out the frame if the inbound port is the same as the port in the database entry that was found, whereby the frame is not forwarded to the port on which it was received.

19. An article of manufacture for a layer-two device of a network, the layer-two device including a plurality of ports and a processor, the article comprising:

computer memory a program encoded in the memory, the program, when executed, instructing the controller to examine the source address of a frame received on an inbound port; determine whether the source address is in a Filtering database; forward the frame if the source address is not in the Filtering database; determine whether the frame was previously received on a port other than the inbound port if the source address is in the Filtering database; discard the frame if the frame was previously received on a port other than the inbound port; and perform a forwarding routine if the frame was not discarded;

the forwarding routine being performed by examining a destination address of the frame; finding a database entry having the same destination address as the frame; forwarding the frame to all of the ports except ports that have seen the frame if an entry is not found; discarding the frame if an entry was found and the inbound port is the same as a destination address port; and forwarding the frame to the destination address port if an entry was found and the inbound port is not the same as a destination address port.

20. The article of claim 19, wherein the controller is instructed to determine whether the frame was previously received by maintaining a hash table of frame identifiers; indexing the hash table; and examining the contents of the indexed frame identifier.

21. The article of claim 20, wherein each frame includes a Frame Check Sequence code, and wherein the hash table is indexed by accessing at least N bytes of the Frame Check Sequence code of the frame, where positive integer N>2.

22. The article of claim 20, wherein the controller is further instructed to time-age the frame identifiers in the hash table.

23. The article of claim 19, wherein the controller is further instructed to perform a persistence check when determining whether the frame was previously received on a port other than the inbound port.

24. A layer-two device for a local area network, the device comprising a processor for handling a MAC frame received on an inbound port by determining whether the frame was previously received on a port other than the inbound port, and discarding the frame if the frame was previously received on a port other than the inbound port.

* * * * *